United States Patent [19]

Yaguchi

[11] Patent Number: 4,595,841

[45] Date of Patent: Jun. 17, 1986

[54] FULL-COVERED PORTABLE GENERATOR

[75] Inventor: Tadahiro Yaguchi, Saitama, Japan

[73] Assignee: Honda Giken Kogyo Kabushiki Kaisha, Tokyo, Japan

[21] Appl. No.: 590,610

[22] Filed: Mar. 19, 1984

[30] Foreign Application Priority Data

Mar. 18, 1983 [JP] Japan .................................. 58-45590
Mar. 18, 1983 [JP] Japan ............................ 58-39544[U]

[51] Int. Cl.[4] ......................... H02P 9/04; F02B 63/04

[52] U.S. Cl. .................................. 290/1 A; 290/1 B; 290/1 C; 322/1; 310/50; D13/1; D15/1; 123/2

[58] Field of Search ....................... 290/1 A, 1 B, 1 C; 310/47, 50, 89; 322/1; D13/1, 2, 3; D15/1; 123/2; 307/150

[56] References Cited

U.S. PATENT DOCUMENTS

| | | | |
|---|---|---|---|
| D. 201,327 | 6/1965 | Hori et al. | D15/1 |
| D. 205,975 | 10/1966 | Kitaadachi-gun | D13/1 X |
| D. 275,946 | 10/1984 | Ekuan | D13/1 |
| D. 276,160 | 10/1984 | Tuggle et al. | D15/1 |
| D. 276,515 | 11/1984 | Yaguchi | D13/1 |
| D. 277,954 | 3/1985 | Mizushima | D13/1 |
| 3,259,752 | 7/1966 | Honda | 290/1 |
| 4,173,951 | 11/1979 | Ishirhara | 290/1 A X |

FOREIGN PATENT DOCUMENTS

| | | | |
|---|---|---|---|
| 1249585 | 9/1967 | Fed. Rep. of Germany . | |
| 53-3302 | 1/1978 | Japan . | |
| 0112820 | 9/1980 | Japan | 290/1 A |
| 59-17097 | 7/1982 | Japan . | |
| 0197418 | 11/1983 | Japan | 290/1 A |
| 0197417 | 11/1983 | Japan | 290/1 A |
| 0197416 | 11/1983 | Japan | 290/1 A |

OTHER PUBLICATIONS

An Article from a German Test Magazine "Viel Geld fur Wenig Watt".

Service Manual for a Yamaha Portable Generator EF500S, Sep. 1982.

Honda E80 Portable Generator Manual (Japanese publication), 1966.

*Primary Examiner*—William M. Shoop, Jr.
*Assistant Examiner*—Shik Luen Paul Ip
*Attorney, Agent, or Firm*—Armstrong, Nikaido, Marmelstein & Kubovcik

[57] ABSTRACT

A full-covered portable generator composed of a generator core, an engine for driving the generator core enclosed by a cover comprising discrete front, rear and bottom cover elements. The rear cover element is detachably joined to the rear cover element along lateral peripheral surfaces of the generator. The engine and its main components are each covered at least in part by the front cover element in a manner that they are exposed when the rear cover element is detached from the front cover element, for facilitation of the maintenance thereof. Various controls and readouts or displays are arranged on the front cover element transversely of the generator, preferably in an order corresponding to the required order in which they are operated or read. A carrying handle is arranged on an upper surface of the front cover element and extends transversely of the generator.

10 Claims, 8 Drawing Figures

FULL-COVERED PORTABLE GENERATOR

BACKGROUND OF THE INVENTION

1. Field of the Invention

This invention relates to improvements in or to a full-covered portable generator which is used as a compact and handy power supply.

2. Description of the Prior Art

A full-covered portable generator in general is composed of an engine, its auxiliaries, a generator core, etc. These components are wholly covered with a cover for sound-proofing purposes. For the maintenance of the generator components, the cover has to be removed from the generator. However, since such a full-covered portable generator is wholly enclosed by several cover elements, it is hard and time-consuming to remove all the cover elements from the generator, thereby making it difficult to carry out maintenance. Even if the cover is so constructed as to allow removal of one or more of its cover elements, most of the components of the generator covered within the cover are not accessible from the outside when such one or more cover elements are removed from the generator, also making it difficult to carry out maintenance. Thus, conventional full-covered portable generators require improvements to facilitate maintenance of the components.

Frequently operated controls of a full-covered portable generator include a switch for starting and stopping the engine, a recoil starter control, a plug socket output terminal, and a safety switch for prevention of overcurrent of the output. In a conventional generator of this kind, these controls are mounted on a front surface, a rear surface or lateral side surfaces of the generator, making it hard to operate the engine during starting. Further, various readouts or displays including a pilot lamp for indicating the on-off state of the engine starting/stopping switch, an output meter, and an oil level indicator lamp are generally mounted on a front surface of the generator. This makes it difficult to correctly read or check indications given by these readouts, when the generator is placed on the ground or floor.

SUMMARY OF THE INVENTION

It is a first object of the present invention to provide a full-covered portable generator which is arranged and constructed to facilitate the maintenance thereof.

It is a second object of the invention to provide a full-covered portable generator in which various controls including an engine-starting/stopping switch are arranged to enhance their operability.

It is a third object of the invention to provide a full-covered portable generator in which various readouts are arranged to facilitate reading-out or checking even when viewed from above.

According to the present invention, a full-covered portable generator comprises an engine, its auxiliaries or components, a generator core driven by the engine, etc. and is wholly enclosed by a cover comprising a bottom cover element, a front cover element, and a rear cover element which cover a bottom portion, a front portion and a rear portion of the generator, respectively. The engine and the generator core are supported on the bottom cover element. The front cover element has an opening facing rearwardly of the generator. A plurality of control means for controlling the engine and the generator core are arranged on the front cover element. A cylinder section of the engine and the engine auxiliaries are juxtaposed to each other and each disposed at least in part within the rear cover element. The rear cover element is detachably joined to the front cover element along a lateral peripheral portion of the generator.

The above and other objects, features and advantages of the invention will be more apparent from the ensuing detailed description taken in conjunction with the accompanying drawings.

DETAILED DESCRIPTION OF THE PREFERRED EMBODIMENT

Figure 1:
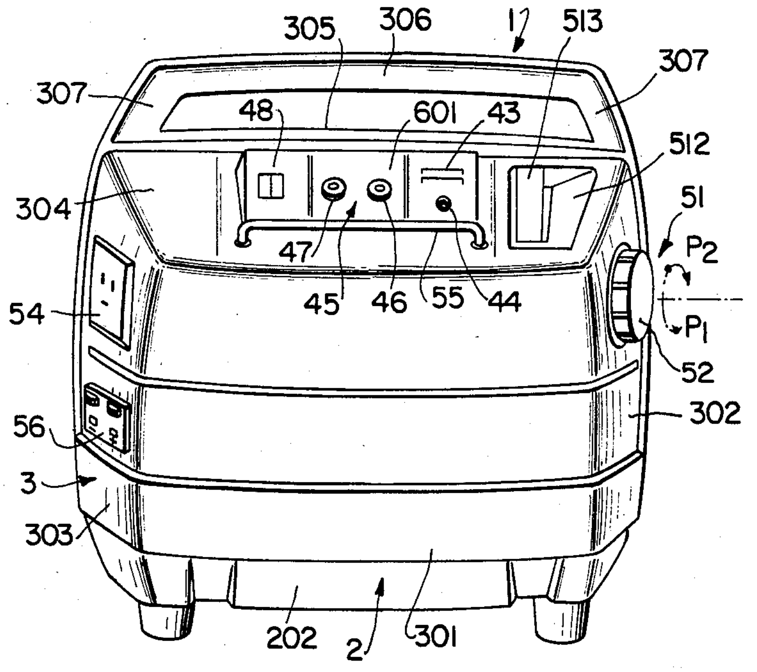
FIG. 1 is a front view of a full-covered portable generator of the preferred embodiment of the present invention.

A full-covered portable generator 1 according to the present invention is equipped with a soundproof cover covering the whole outer surfaces of the generator. The cover comprises a base 2 as a bottom cover element, a front cover element 3 and a rear cover element 4. The front and rear cover elements 3 and 4 are secured to the base 2. The two cover elements 3 and 4 are joined together in an axially splittable manner so that they can be separated from each other along axially intermediate portions of the opposite side surfaces of the generator and axially intermediate portions of the ceiling or upper side surface thereof. The rear cover element 4 is detachable from the front cover element 3 so that the cover element 4 alone can be removed from the front cover element 3 and the base 2.

The base or bottom cover element 2 is formed of a stamped steel plate and has a dish configuration with its transverse size larger than its axial size. The base 2 comprises a generally rectangular plate-like bottom portion 201 which is usually disposed horizontally, and a vertical peripheral wall portion 202 extending upwardly from the four sides of the bottom portion 201. The wall portion 202 has a rear wall portion 202A formed with an external air intake port 203 formed by a louver, extending from a transverse central part of the generator to a location near one transverse end thereof, that is, at a zone above which an engine is located. Four mounts formed of rubber, are secured to the lower side surface of the bottom plate 201 of the base 2 at the four corners thereof.

The engine 5 and a generator core 6 are supportedly mounted on the bottom plate 201 of the base 2, with their axes directed transversely to the generator 1. The engine 5 comprises a crankcase 501 disposed at a relatively lower level, a cylinder block 502 disposed above the crankcase 501, a cylinder head 503 disposed above the cylinder block 502, and a cylinder head cover 504. A cylinder section formed by the cylinder block 502 and the cylinder head 503 is obliquely disposed or extends rearwardly upwardly with the cylinder head 503 located rearwardly of the rear edge of the front cover element 3. A carburetor 505 is arranged at one side of the rearwardly upwardly extending cylinder section, and an air cleaner 506 is located at the other or opposite side thereof, respectively, and both of the members 505 and 506 are located rearwardly of the rear edge of the front cover element 3. An exhaust pipe 507 extends rearwardly downwardly from the cylinder head 503 and is connected to a muffler 508 disposed at a rear side of the generator core 6. The muffler 508 is located rearwardly of the rear edge of the front cover element 3 and vertically extends from a substantially vertical center to a location near the base 2. Arranged above the muffler 508 is a box-shaped chamber 509 for collecting therein exhaust gas and cooling air introduced through the air intake port 203. the chamber 509 has its rear side surface formed with an exhaust port 510 formed by a louver. The above-mentioned components are located at least in part above the level of the wall portion 202 of the base 2.

The front cover element 3 is formed of a solid casting, preferably a die casting of an aluminum base alloy and comprises a front side wall 301, opposite lateral side walls 302 and 303, a sloped front side upper wall 304, and a ceiling wall 305. The front side wall 301 and opposite lateral side walls 302 and 303 have their lower edges joined to upper edges of the front side surface and opposite lateral side surfaces of the wall portion 202 of the base 2, respectively. The lateral side walls 302 and 303 have their rear side edges located at substantially axially central portions of the lateral side surfaces of the wall portion 202. The aforementioned air cleaner 506, carburetor 505, cylinder section 502, 503, 504, exhaust pipe 507, and muffler 508 are located rearwardly of the rear side edges of the lateral side walls 302 and 303. The lateral side walls 302 and 303 extend obliquely or forwardly towards the center so that the frontmost part of the front side wall 303 has a reduced width. The sloped front side upper wall 304 is inclined in a forward and upward direction.

The ceiling wall 305 of the front cover element 3 extends transversely to the generator 1. A carrying handle 306 is mounted on wall 305 and extends parallel therewith. That is, the carrying handle 306 has downwardly hooked opposite ends 307 and 307 integrally joined to the upper surface of the ceiling wall 305. In the illustrated embodiment, the carrying handle 306 is formed integrally in one-piece with the front cover element 3. Alternatively, the carrying handle 306 may be formed in a separate body from the front cover element 3 and joined to the latter by a suitable means.

Various controls and readouts or displays are arranged on the sloped front side upper wall 304 and lateral side walls 302 and 303 of the front cover element 3, for controlling and checking the operations of the engine and the generator core.

More specifically, the sloped front side upper wall 304 of the front cover element 3 is provided with a recoil starter control 512 disposed at a right-hand side as viewed in FIG. 1, with its grip 513 directed upward.

Arranged on the same wall 304 to the left of the recoil starter control 512, as viewed in FIG. 1, are a pilot lamp 43 adapted to indicate through turning-on thereof an on-state of an engine starting/stopping switch, hereinafter referred to, and an oil alert lamp 44 adapted to indicate lock of engine oil. These lamps 43, 44 have their exposed light-emission surfaces directed upward. In the illustrated embodiment, the pilot lamp 43 and the oil alert lamp 44 are vertically juxtaposed to each other such that the former is disposed at a higher level than the latter.

Further, a safety switch 45 formed of two or left and right breaker switches 46 and 47, for preventing output overcurrent, is arranged on the sloped front side upper wall 304 of the front cover element 3 at a substantially central location as viewed in FIG. 1. The breaker switch 46, forming part of the safety switch 45, is adapted to protect against overcurrent in the alternating current output, and the other breaker switch 47 is adapted to protect against overcurrent in the direct current output, respectively.

An output meter 48 is located on the sloped front side upper wall 304 of the front cover element 3 on the left side of the safety switch 45 as viewed in FIG. 1, for indicating the frequencies (Hz) of outputs from the generator core, and has its display surface directed upward.

In this manner, the sloped front side upper wall 304 of the front cover element 3 is provided with the recoil starter control 512, the pilot lamp 43 and the oil alert lamp 44, the safety switch 45, and the output meter 48 arranged in the direction in which the carrying handle 306 extends and in the order mentioned starting from one lateral side (from the right side as viewed in FIG. 1 in the illustrated embodiment).

A control 51 for controlling starting and stopping of the engine is arranged on the right side wall 302 of the front cover element 3 forming a lateral side plate of the recoil starter control 512 as viewed in FIG. 1 at an upper location, with its control knob 52 laterally outwardly directed. The control knob 52 is a so-called engine switch and controls the turning-on and -off of the ignition circuit of the engine, the opening and closing of a fuel cock, as well as the opening and closing of a choke valve in the engine. To be specific, when the mark 53 on an end face of the knob 52 registers with a neutral point 1 shown in FIG. 1, the engine switch is in an OFF state. Then, when the knob 52 is rotated clockwise as viewed in FIG. 1 to cause the mark 53 to point to another point P2 in FIG. 1, the engine switch is turned on, whereby the ignition circuit is closed and the fuel cock is opened. When the knob 52 is further rotated clockwise to move the mark 53 beyond the point P2, the choke valve is opened.

A plug socket 54 is arranged on the right side wall 303 at an upper location as viewed in FIG. 1 for supplying an alternating current output, while an output terminal 56 is arranged on the same side wall 303 below the plug socket 54, for supplying a direct current output. Thus, the plug socket 54 and the terminal 56 have their exposed surfaces directed in the opposite direction to the end face of the knob 52.

A cap-shaped hollow portion 311 is provided at the inner surface of the sloped front side upper wall 304 of the front cover element 3, which is defined by the ceiling wall 305, a bottom wall 309 and the lateral side wall 302, and an intermediate vertical partition wall 310 and has an opening facing rearward. A cap-shaped hollow member 701 has its opening directed forwardly and abuts the marginal edge of the opening of the internal space 311 and is rigidly joined thereto by means of an adhesive or the like, thereby defining therein an interval space such as a fuel tank 7 for storing a fuel supply for the engine. In the fuel tank 7, the portion defined within the hollow member 701 is located rearwardly of an upper portion of the front cover element 3 and above the air cleaner, the carburetor, and the engine. A fuel charging port 703 projects from an upper surface 702 of the hollow member 701 defining the fuel tank 7. The port 703 is normally closed with a cap, not shown.

The rear cover element 4 covers the air cleaner 506, the carburetor 505, the engine 5, the muffler 508, and the exhaust gas collecting chamber 509 which are located on a rear portion of the base 2 and exposed rearwardly of the front cover element 3 as stated above. The rear cover element 4 comprises a rear side wall 401, opposite lateral side walls 402 and 403, and a ceiling wall 404 which are formed of a molding of a heat resistant synthetic resin. The ceiling wall 404 has its front end edge formed with a recess 405 located closer to a lateral side of the rear cover element 4 and opening toward the joining rear end edge of the ceiling wall 305 of the front cover element 3, for receiving the fuel charging port 703 of the fuel tank 7. The rear side wall 401 is formed with a window 406 located closer to the other lateral side of the rear cover element 4 and alignable with a rear side surface 509A of the chamber 509.

The ceiling wall 305 of the front cover element 3 has its joining rear end edge provided with a rearwardly projecting fitting tongue 312 at a location closer to a lateral side of the front cover element 3, while the upper surface 702 is provided with an upwardly projected fitting boss 704 at a location closer to the opposite lateral side of the front cover element 3. On the other hand, the peripheral wall portion 202 of the base 2 has its opposite lateral side surfaces 202B and 202B provided with fitting pieces 204 and 204 in the vicinity of its joining portions with the front cover element 3. In mounting, the rear cover element 4 onto the generator 1, first, the cover element 4 is fitted over a rear half portion of the generator 1 such that its celing wall 404 and lateral side walls 402 and 403 abut the respective walls 305, 302 and 303 of the front cover element 3, and then screws 8 are fitted through fitting holes 407 formed in the above-mentioned fitting tongue and fitting pieces to fasten the rear cover element 4 to the front cover element 3. In this way, the whole periphery of the generator 1 is covered with the cover elements 2, 3 and 4, with the exhaust port 510 of the chamber 509 exposed to the outside through the window 406 of the rear cover element 4.

Figure 2:
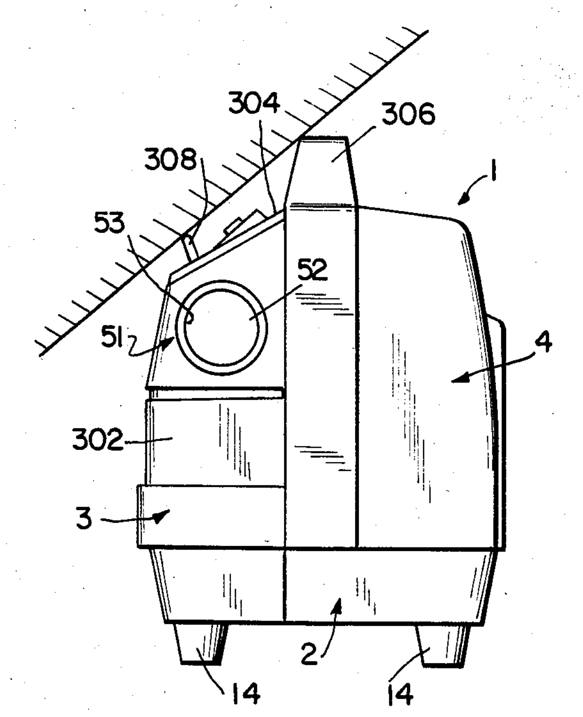
FIG. 2 is a side view of the generator of FIG. 1.
Figure 4:
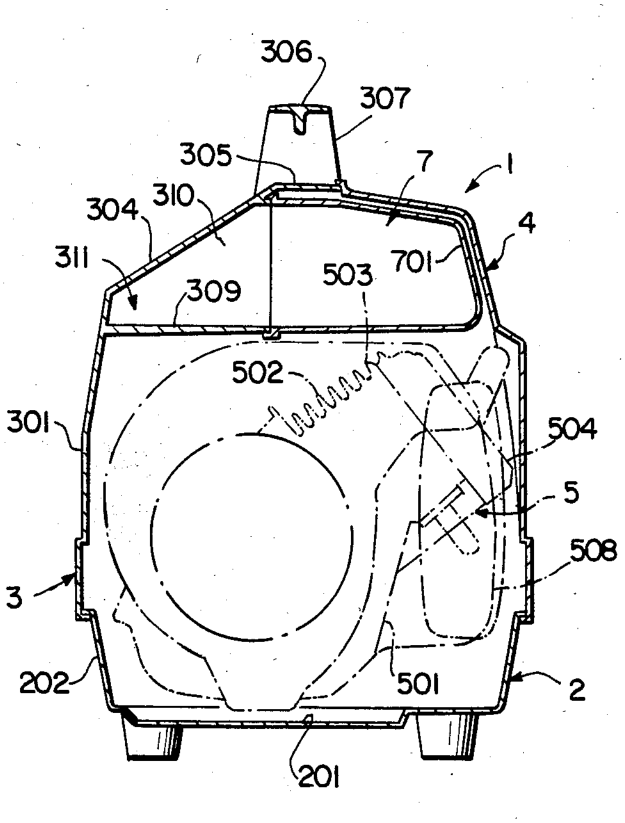
FIG. 4 is a longitudinal vertical sectional view of the cover of the generator.
Figure 3:
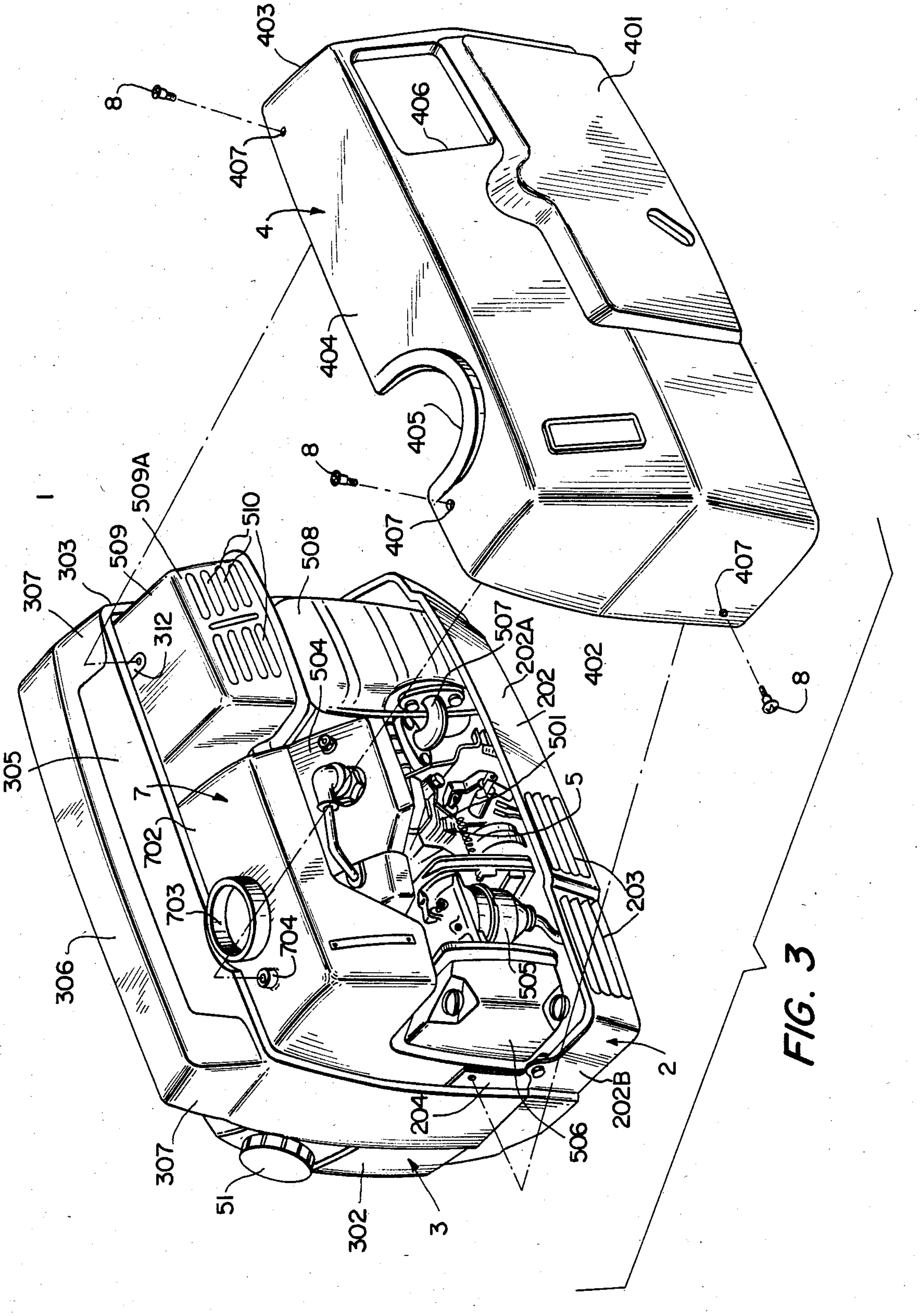
FIG. 3 is a perspective view of the generator with its rear cover element removed, taken from a rear side.
Figure 5:
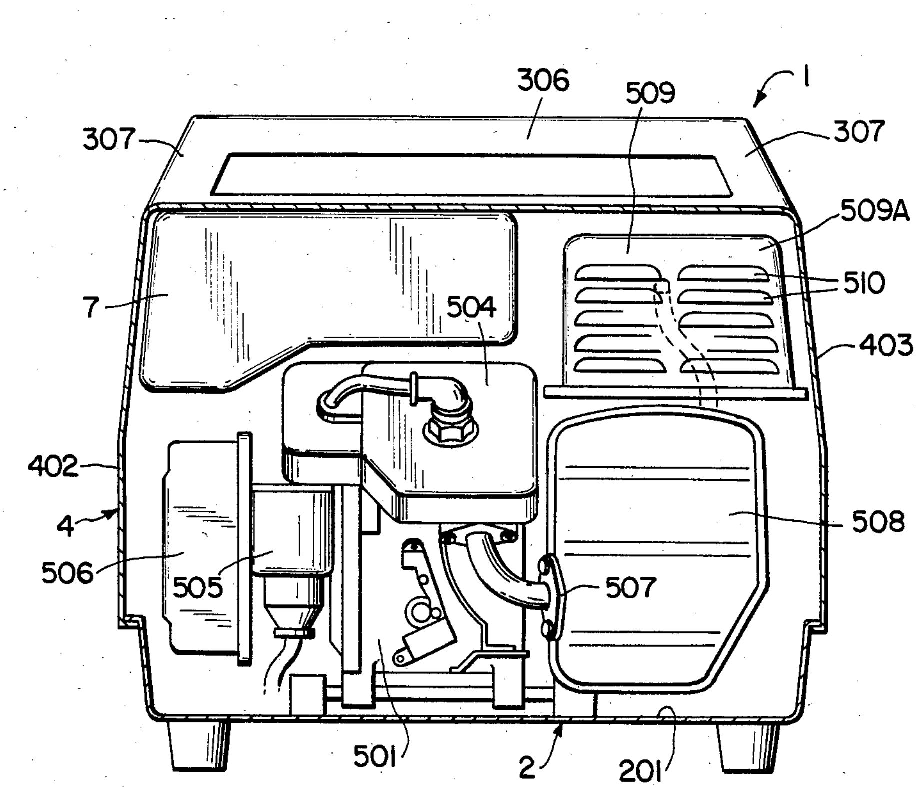
FIG. 5 is a rear view of the interior of the generator with the front cover element in transverse section.
Figure 6:
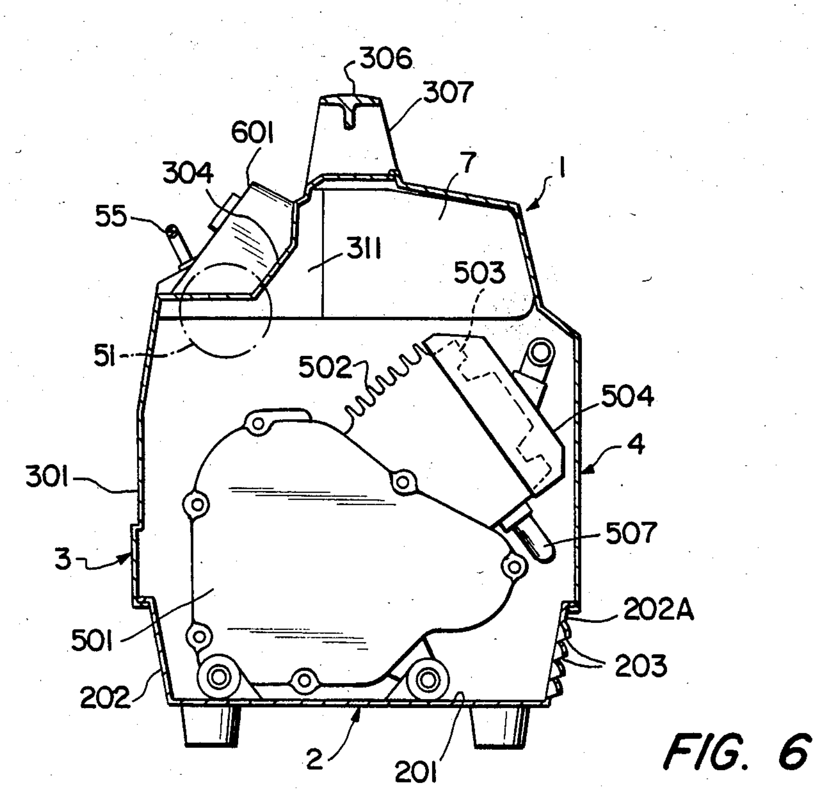
FIG. 6 is a side view showing one side of the interior of the generator with the cover in longitudinal section.
Figure 7:
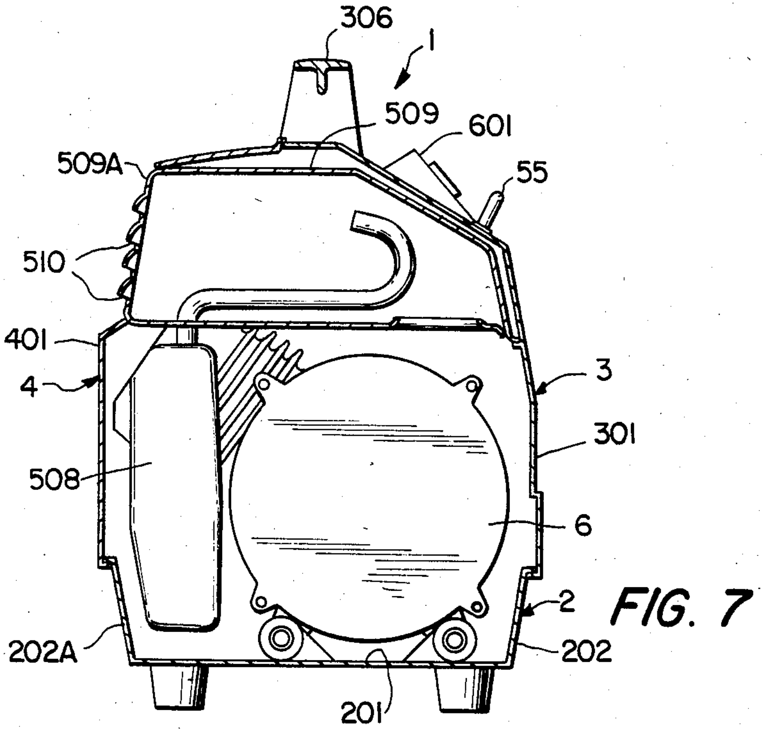
FIG. 7 is a side view showing the other side of the interior of the generator with the cover in longitudinal section.
Figure 8:
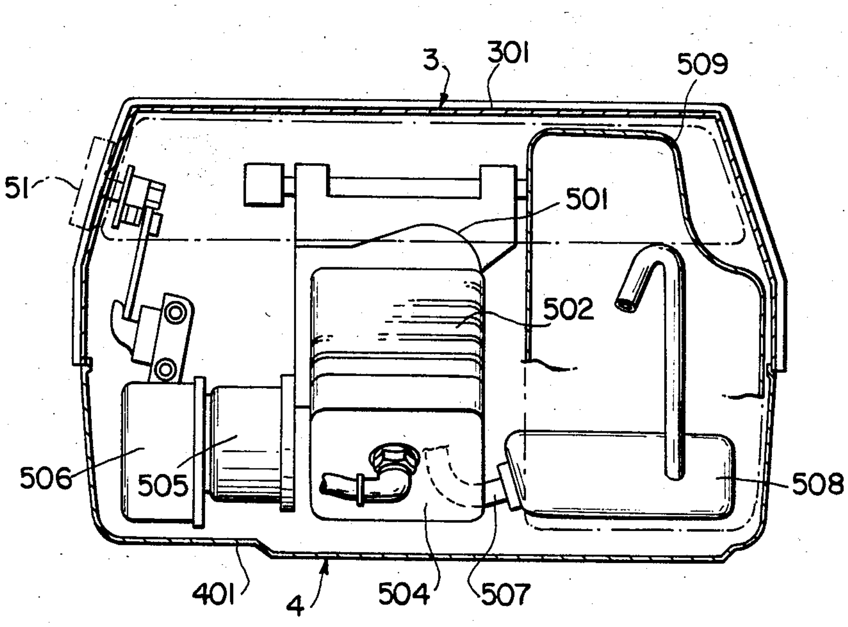
FIG. 8 is a plan view showing an upper side of the interior with the cover in horizontal section.

An elongate U-shaped gurard frame member 308 is fixed on a front portion of the sloped front side upper wall 304 of the front cover element 3 and extends transversely to the generator 1 along the controls on the wall 304 and through a distance larger than the distance between the pilot lamp 43 and the output meter 48. As shown in FIG. 2, the guard frame member 308 is slightly forwardly inclined and has a suitable height considerably larger than the heights of the controls.

The full-covered portable generator according to the present invention provides many excellent results as follows:

(1) Since the entire generator is enclosed within the cover elements 2, 3 and 4, the generator has a high degree of silence, minimizing the noise during operation;

(2) Since the rear cover element 4 is formed of a heat resistant synthetic resin, and the hot component parts are arranged together at a rear portion of the generator, the rear cover element 4 prevents transfer of heat from the hot component parts therethrough, minimizing the adverse thermal influence upon a human body even when the rear cover element is touched during maintenance;

(3) Due to the arrangement of the air cleaner, the carburetor, the cylinder section of the engine, etc. in the rear portion of the generator, while arranging stationary controls on a front surface of the front cover element 3, the rear cover element 4 can be readily removed without hindering the operation of the controls, permitting the maintenance of the air cleaner, carburetor, plug socket, etc. without removing all the cover elements;

(4) Since the rear cover element 4 is detachably joined to the front cover element 3 along lateral peripheral surfaces of the generator such that the component parts to be subjected to maintenance can be exposed to the outside when the rear cover element 4 is removed, the maintenance can be greatly facilitated;

(5) The individual cover elements 2, 3 and 4 are formed of different materials suitable for their respective desired functions. That is, the base 2 as a bottom cover element is formed of a metallic material for positively and stably supporting heavy component parts such as the engine and the generator core. The front cover element 3 is formed of a casting and therefore, is highly imperviousness to noise. In addition, the front cover element formed of a casting permits close-tolerance machining of its fitting portions for controls therein, facilitating the mounting of various controls on the cover element. Furthermore, a front cover element formed of a die casting of aluminum base alloy will have an improved surface appearance and also permit one-piece formation of a carrying handle on the front cover element or direct mounting of such a carrying handle on the latter. On the other hand, the rear cover element formed of a syntheic resin will effectively shut off heat from heat radiating parts arranged in a rear portion of the generator;

(6) Since the soundproof cover for an engine-operated generator comprises two axially discrete parts splittable from each other, one of which has its inner surface formed integrally with a partition wall defining a cap-shaped internal space opening toward the opening of the same part, and a separately fabricated cap-shaped hollow member is joined to the internal space to form a fuel tank, the fuel tank can have a substantially increased internal volume without impairing the layout, also contributing to enhancement of the degree of silence of the generator;

(7) An upper surface of the soundproof cover provided with the carrying handle 306 at a higher level is also provided with the recoil starter control 41, the pilot lamp 43 and the oil alert lamp 44, the safety switch 45 and the output meter 48 arranged from one lateral side of the generator to the opposite lateral side and parallel with or in the direction of extension of the carrying handle 306. A lateral side surface of the cover closer to the recoil starter control 41 is provided with the engine starting/stopping control 51, while the other or opposite lateral side surface of the cover is provided with the output terminal section 54, 56. The above arrangement can provide excellent results as follows:

(i) Since the recoil starter control 41, the pilot lamp 43 and the oil alert lamp 44, the safety switch 45 and the output meter 48 are arranged on the upper surface of the soundproof cover continuously from the engine starting/stopping control 51 arranged on one lateral side surface of the soundproof cover and in a predetermined order corresponding to a desirable operating and reading order, these controls have greatly improved operability from the viewpoint of human engineering, and also the readouts 43, 44 and 48 facilitate reading-out of their indications from above;

(ii) Since the engine starting/stopping control 51 and the output terminal section 54 and 56, which have particularly important roles in the operation and usage of the generator, are arranged on opposite lateral side surfaces of the cover in a manner separate from the other controls and readouts, the control 51 and the terminal section 54 and 56 can be operated and used independently of each other by virtue of their isolated locations;

(8) Since the sloped front side upper wall 304 of the front cover element 3 is forwardly inclined which forms the upper surface of the soundproof cover provided with the recoil starter control 41, the pilot lamp 43, the oil alert lamp 44, the safety switch 45 and the output meter 48, these controls and readouts are accordingly forwardly inclined, thereby facilitating the operation and reading-out of them;

(9) By virtue of the provision of the guard frame member 308 on the sloped front side upper wall 304 of the front cover element 2, the safety switch 45 and the readouts 43, 44 and 48 are located below a plane extending through an uppermost edge of the carrying handle 306 and an uppermost edge of the guard frame member 308 as best shown in FIG. 2, thereby preventing these switch and readouts from being damaged by something falling on the generator.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A full-covered portable generator having a bottom portion, a front portion, a rear portion, and a lateral peripheral portion between said front portion and said rear portion, said generator comprising:

an engine having an obliquely disposed cylinder section; a plurality of components for said engine juxtaposed to said cylinder section; a generator core driven by said engine; a plurality of control means for controlling said engine and said generator core; a bottom cover element formed of steel plate covering the bottom portion of said generator and comprising a base for supporting said engine and said generator core; a molded front cover element covering the front portion of said generator and having an opening therein, said control means being located on said front cover element; and a rear cover element covering said rear portion of said generator, said rear cover element being detachably joined to said front cover element along a vertical joining plane therebetween at said lateral peripheral portion of said generator such that said front cover element and said rear cover element are horizontally separable at said vertical joining plane, each of said cylinder section of said engine and said engine components having at least a portion thereof disposed within said rear cover element.

2. A full-covered portable generator as claimed in claim 1, wherein said front cover element is formed of a die casting of an aluminum base alloy.

3. A full-covered portable generator as claimed in claim 1, further including a fuel tank for storing fuel for said engine, said fuel tank comprising a cap-shaped hollow portion formed integrally with an inner surface of said front cover element at an upper portion thereof and having an opening facing towards the rear of said generator, and a cap-shaped hollow member having an opening joined with said opening of said cap-shaped hollow portion to define a fuel tank space therein.

4. A full-covered portable generator as claimed in claim 1, wherein said rear cover element is formed of a heat resistant synthetic resin.

5. A full-covered portable generator as claimed in claim 1, further including a carrying handle formed integrally with said front cover element, said carrying handle extending transversely of said generator along said vertical joining plane of said front and rear cover elements.

6. A full-covered portable generator as claimed in claim 4, wherein said control means include a recoil starter control, a plurality of display means, control means for starting and stopping said engine, and terminal means for providing outputs from said generator; wherein said front cover element has a sloped front side wall disposed at an upper portion of said generator and forwardly upwardly inclined when said generator is disposed horizontally, and opposite lateral side walls located at opposite sides of said sloped front side wall and continuous therewith; and wherein said recoil starter control and said display are arranged on said sloped front side wall, said control means is disposed on one of said opposite lateral side walls, and said terminal means are arranged on the other of said opposite lateral side walls.

7. A full-covered portable generator as claimed in claim 4, wherein said sloped front side wall extends in the direction in which said carrying handle extends, said recoil starter control and said display means being juxtaposed in the direction of extension of said carrying handle.

8. A full-covered portable generator as claimed in claim 7, wherein said display means include a pilot lamp for indicating whether or not said engine is in an operative state, and an output meter for indicating the frequency of the outputs of said generator.

9. A full-covered portable generator as claimed in claim 1, wherein said generator has opposite lateral side surfaces and a ceiling surface between said opposite lateral side surfaces, said lateral peripheral portion of said generator circumferentially extending along said opposite lateral side surfaces and said ceiling surface.

10. A full-covered portable generator as claimed in claim 5, including a guard frame member on said sloped front side wall of said front cover element and extending transversely of said generator.

* * * * *